Patented May 3, 1927.

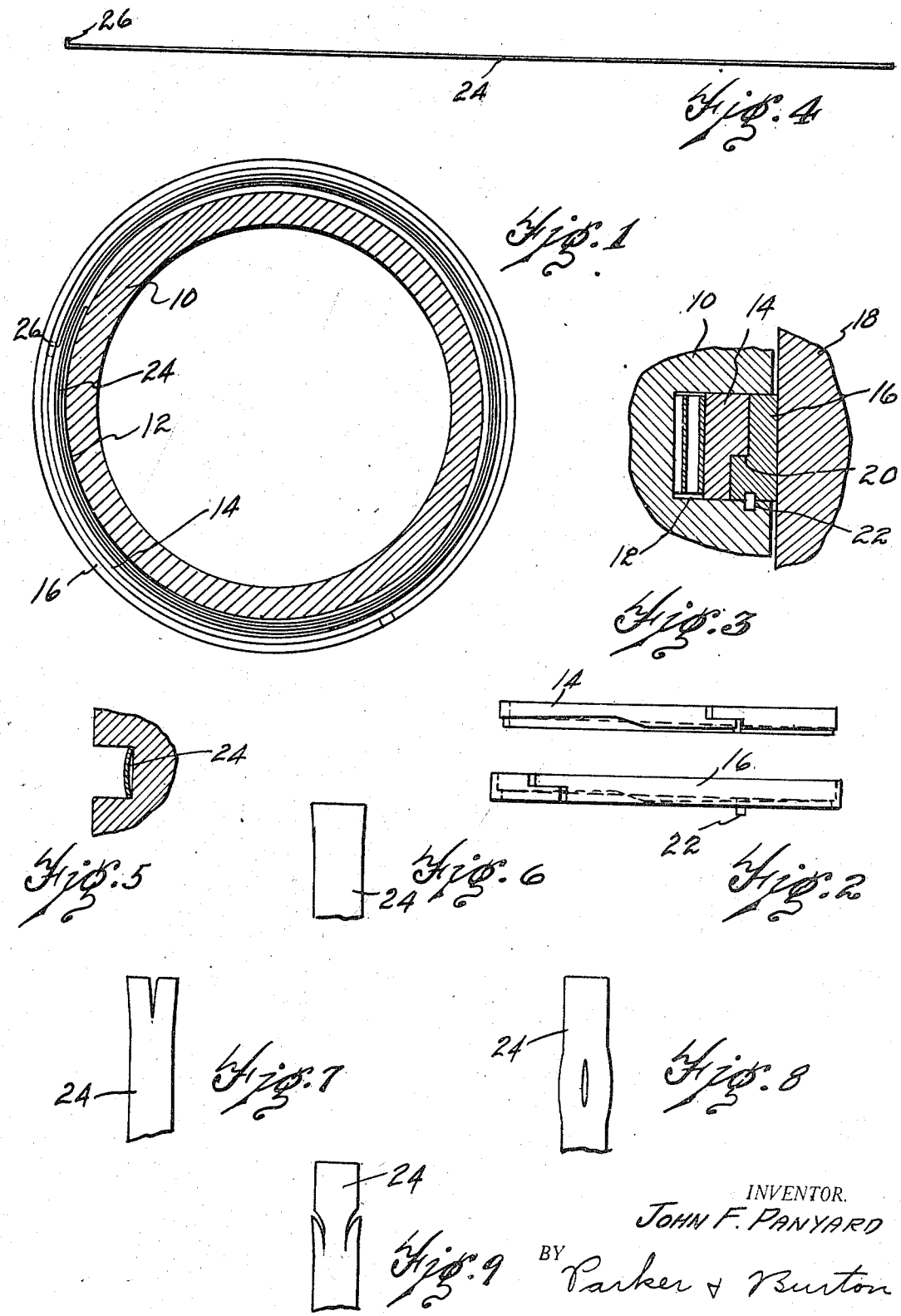

1,626,750

UNITED STATES PATENT OFFICE.

JOHN F. PANYARD, OF DETROIT, MICHIGAN.

PISTON PACKING.

Application filed August 28, 1925. Serial No. 53,019.

My invention relates to improvements in piston packing. This application is a continuation in part of application Serial No. 629,994, filed April 5, 1923.

The object of my invention is to provide a piston packing comprising a plurality of ring sections independently stabilized within the groove and so constructed and arranged that rotation of one section relative to the other wedges the packing against the side walls of the groove and holds it against the cylinder wall. An advantage of packing of this type is that a close joint is maintained with the side walls of the groove without the exertion of excessive pressure against the wall of the cylinder.

An important advantage of my invention resides in the employment in packing of the character described of a pair of co-operating split expansible ring sections, each of substantially the width of the groove, one section being located within the other so that the outer section alone engages the cylinder wall, which sections have helical meeting faces whereby upon relative rotation they are wedged against the side walls of the groove, together with means engaging one section to urge it rotatably counter the helical face of its co-operating section.

A valuable feature consists in the use of a spring wound upon itself about the piston in the bottom of the groove engaging one ring section to urge the same rotatably to wedge the packing against the side walls of the groove, which spring is anchored to the piston by having one end spread outwardly to be wedged within the groove to secure the ring therein. The end of the spring may be spread apart to anchor it to the groove in a number of different ways, as illustrated in the drawing.

Other objects and meritorious features will more fully appear from the following description, appended claims and accompanying drawings, in which:

Figure 1 is a horizontal sectional view through a piston provided with my improved packing.

Fig. 2 is a side elevation of my improved packing rings separated from each other.

Fig. 3 is a fragmentary sectional view through a piston showing the rings seated within the groove.

Fig. 4 is a side elevation of the spring.

Figs. 5 to 9 inclusive show fragmentary end elevations of modified forms of springs anchored within the groove of the piston as set forth herein.

In the drawing, let 10 indicate a piston provided with the usual packing groove 12 within which is disposed my improved packing. My packing comprises a pair of split expansible co-operating ring sections 14 and 16. Ring section 14 is disposed within ring section 16. Each ring section is expanded the width of the groove in the piston. Ring section 14 is seated within the bottom of the groove. Ring section 16 superimposes ring section 14 and engages the cylinder wall 18. The two ring sections have helical meeting faces 20. As each ring section is approximately the width of the groove they are independently stabilized within the groove and as rotatable pressure is exerted upon one ring section counter the other, the two ring sections are wedged against the side walls of the groove.

I have shown ring section 16 as anchored against rotation within the groove by means of a pin 22. Ring section 14 is held under rotatable pressure counter the stationary helical face 20 of ring section 16 through the employment of a spring 24 which is turned up at one end as at 26 into the split of ring section 14, engaging the same to exert a rotatable impulse thereon, and is anchored at the opposite end in the bottom of the groove to the piston.

Various means may be employed to anchor the spring and piston and I have here shown in Figs. 5 to 9 inclusive different methods of spreading the end of the spring after it has been positioned in the groove so as to wedge such end tightly within the groove to anchor the spring to the piston. In Fig. 5 I have shown the spring as formed at the end on a radius, the concaved side of which is placed against the bottom of the groove and the end of the spring is spread by hitting the convex side with a hammer to spread the spring against the side walls of the groove.

In Fig. 6, I have shown a flat spring the end of which is merely hammered to spread it in width so as to be wedged against the side walls of the groove.

In Fig. 7, I have shown a flat spring which is split inwardly from the end and these split ends are spread apart in the bottom of the groove.

In Fig. 8, I have shown a spring which is slitted adjacent to the end and spread apart at the slit, while in Fig. 9, I have shown a spring having tongue portions adapted to be spread outwardly from each side to engage the side walls of the groove.

Obviously any one of these forms or yet other forms would be suitable to anchor the spring against rotation within the groove.

What I claim is:

1. In piston packing, a piston having a groove for packing, a split expansible ring section approximately the width of the groove seated in the bottom thereof, a second ring section of approximately the width of the groove seated therein superimposing the first ring section, said sections having helical meeting faces whereby rotation of one section in a given direction wedges the combined packing axially against the side walls of the groove, means engaging one of said sections to exert rotatable pressure thereon to wedge the sections axially within the groove, said other section so mounted within said groove as to resist rotation therein.

2. In piston packing, a piston having a groove for packing, packing in said groove comprising a split expansible ring section approximately the width of the groove and seated in the bottom thereof, a second split expansible ring section approximately the width of the groove seated therein superimposing the first ring section, one of said sections being anchored to the piston, the other section being rotatable within the groove, and a spring engaging the rotatable ring section to exert rotatable pressure thereon counter the helical face of the anchored ring section.

3. In piston packing, a piston having a groove for packing, packing in said groove comprising a split expansible ring section approximately the width of the groove rotatably disposed in the bottom thereof, a split expansible ring section approximately the width of the groove anchored therein completely superimposing the first ring section, said ring sections having helical lateral meeting faces, a spring anchored to the piston and wound thereabout in the bottom of the groove engaging the first ring section to urge the same rotatably to wedge it against the anchored ring section.

4. In piston packing, a piston having a groove for packing, packing in said groove comprising a pair of ring sections having helical meeting faces whereby upon rotation of one section relative to the other counter the helical faces the axial diameter of the combined packing is increased and the ring sections are wedged against the side walls of the groove in the piston, and a spring engaging one of said ring sections to exert rotatable pressure thereon, said spring anchored to the piston by having a portion spread outwardly within the groove to be wedged in place therein, said other section so mounted within the groove as to resist rotation therein.

5. In piston packing, a piston having a groove for packing, packing in said groove comprising a rotatable ring section having a helical lateral face, said groove provided a helical lateral meeting face whereby with a helical lateral meeting face whereby upon rotation of the ring section counter the helical face of the groove the ring is wedged thereagainst, and a spring anchored to the piston, being spread within the groove against the side walls thereof and engaged to the ring to exert rotatable pressure thereon to wedge the same axially against a side wall of the groove.

6. In piston packing, a piston having a groove for packing, packing in said groove comprising a ring section having a helical face, said groove provided with a cooperating meeting helical face, said section adapted upon its rotation to be wedged axially within the groove, and a spring spread apart at one end within the groove to be anchored to the piston, said spring engaged with the ring section to urge the same rotatably within the groove.

7. In piston packing, a piston having a groove for packing, the packing in said groove comprising a split expansible ring section approximately the width of the groove rotatably disposed within the bottom of the groove, a second split expansible ring section approximately the width of the groove anchored therein superimposing the first ring section, said ring sections having helical meeting shoulders whereby rotation of the first ring section in a given direction wedges the ring sections against the side walls of the groove, and a spring wound about the piston in the bottom of the groove and anchored thereto by being spread apart at one end to be wedged within the groove and engaged at the opposite end to the first ring section to exert rotatable pressure thereon counter the helical face of the second ring section.

8. In piston packing, a piston having a groove for packing, a ring section rotatably disposed therein, said groove and ring section provided with meeting helical faces adapted upon rotation of the ring within the groove in a given direction to wedge the ring axially within the groove, a spring anchored within the groove by being spread apart to be wedged therein and engaged with the ring section to exert rotatable pressure thereon.

In testimony whereof, I sign this specification.

JOHN F. PANYARD.